United States Patent [19]  
Guarracini et al.

[11] 4,402,072  
[45] Aug. 30, 1983

[54] VIDEO DISC MASTERING USING GIMBALLED AIR PUCK

[75] Inventors: Joseph Guarracini, Lawrenceville; Joseph L. Walentine, Princeton, both of N.J.

[73] Assignee: RCA Corporation, New York, N.Y.

[21] Appl. No.: 258,758

[22] Filed: Apr. 29, 1981

[51] Int. Cl.³ .............................................. G11B 3/10
[52] U.S. Cl. .................................... 369/132; 360/102
[58] Field of Search ............... 358/342, 299; 360/102, 360/103; 369/132, 255, 247

[56] References Cited

U.S. PATENT DOCUMENTS

| | | | |
|---|---|---|---|
| Re. 29,113 | 1/1977 | Halter | 358/128 |
| 2,937,240 | 5/1960 | Harker | 360/103 |
| 3,835,262 | 9/1974 | Moritz et al. | 179/100.4 |
| 3,842,194 | 10/1974 | Clemens | 178/6.6 A |
| 4,044,379 | 8/1977 | Halter | 358/128 |
| 4,310,915 | 1/1982 | Gunter | 369/132 |
| 4,317,192 | 2/1982 | Castle | 369/132 |

Primary Examiner—Alan Faber  
Attorney, Agent, or Firm—E. M. Whitacre; J. S. Tripoli; J. E. Roehling

[57] ABSTRACT

A gimballed air puck is used in a video disc mastering system for controlling the depth to which an electromechanical stylus cuts into a metal substrate surface. Air is directed through the air puck toward the substrate surface to maintain the cutting stylus at a given cutting depth. The air puck is gimballed or swivelled to permit the cutting stylus to follow the undulating surface of the substrate during the mastering operation.

16 Claims, 5 Drawing Figures

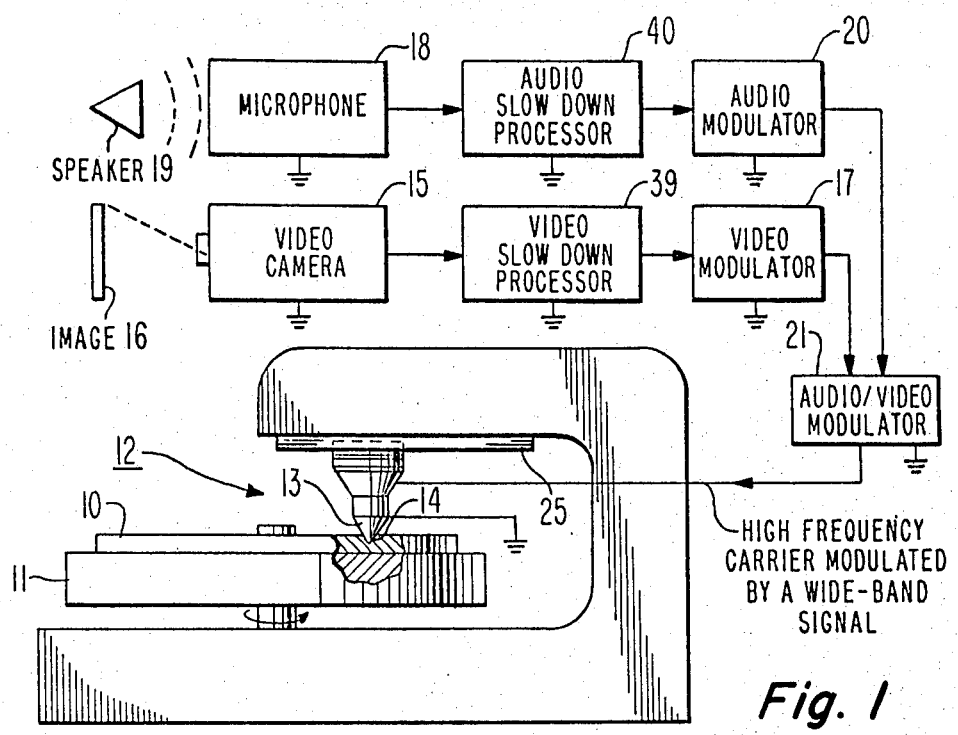
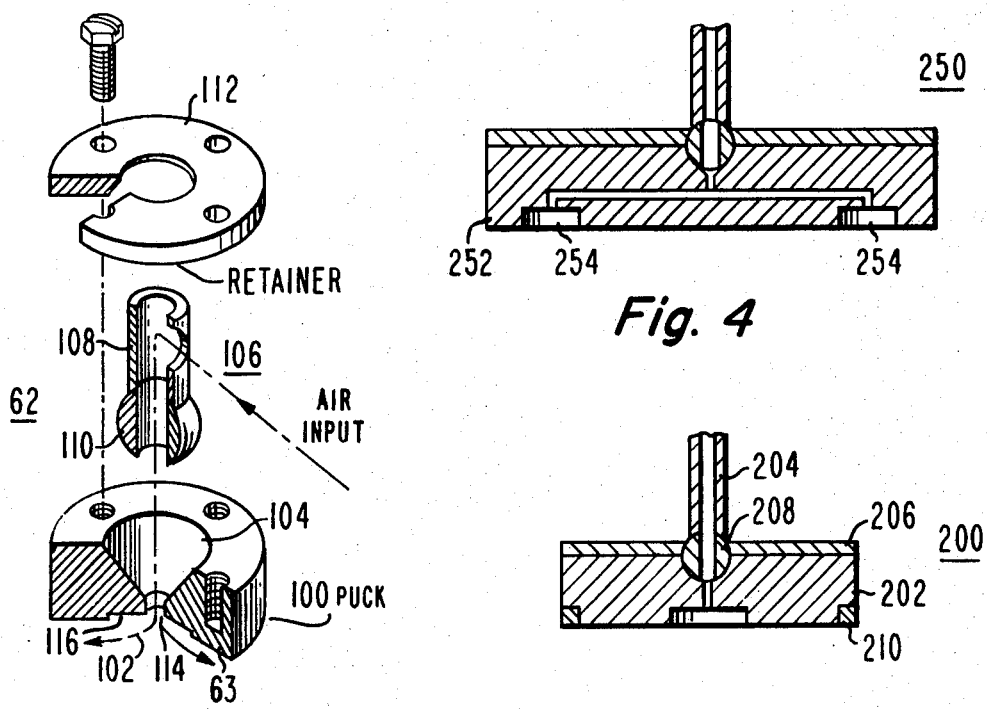
Fig. 1
Fig. 3
Fig. 4
Fig. 5

VIDEO DISC MASTERING USING GIMBALLED AIR PUCK

The present invention relates generally to apparatus for recording short wavelength modulation in a substrate and, more particularly, to electromechanical recording apparatus advantageously employed in the formation of high density information records, such as video disc records of the type described in U.S. Pat. No. 3,842,194 to J. K. Clemens.

The Clemens' patent discloses a video disc for use with a playback system of the variable capacitance type. In one configuration of the Clemens' system, information representative of recorded picture and sound is encoded in the form of a relief pattern in a relatively fine spiral groove on the surface of a disc record. For example, groove widths of approximately 2.6 micrometers and groove depths of about 0.5 micrometers may be used. During playback, capacitive variations between a conductive electrode on a stylus and a conductive property of the disc record are sensed to recover the prerecorded information.

In accordance with the Clemens' format, the video information may be recorded as relatively short (e.g., 0.6–1.6 micrometers) relief variations along the length of the spiral groove. Illustratively, the method of recording may be of a type shown in U.S. Pat. No. 4,044,379 to J. B. Halter. Pursuant to the Halter method, an electromechanically-driven stylus (e.g., of diamond) having a triangular shape responsive to a combined video and audio signal records the relatively short geometric variations, representative of the time variations of the signal, on a surface of a metal substrate. After the electromechanical recording operation, the recorded surface of the metal substrate has a relief pattern corresponding to that which is desired in the final record. In the replicating process, masters are made from the substrate. Molds are then made from the masters and stampers are made from the molds. The stampers are used in the process of pressing vinyl records having the desired relief pattern.

In order to record the fine groove and signal structure typically employed in video discs, the recording stylus must cut the groove and signal information without tearing, smearing, chattering, ripping or chipping the surface of the metal substrate during the recording process. The geometric variations along the length of the groove should be a substantially accurate representation of the modulated signals recorded thereon. Bearing in mind the extremely dense nature of the information recorded in the groove structure of the video disc, it will be appreciated that the generation of substrates of acceptable quality is critical in the record mastering process. Any significant incidence of machining imperfections in the finished surface results in a substrate which is not acceptable for manufacturing records having such a dense information content.

In U.S. Pat. No. 3,835,262 issued to S. N. Moritz et al. on Sept. 10, 1974 entitled "Video Disc Cutting Using Pressurized Air to Control Depth of Grooves", an electromechanical video disc cutting apparatus having an air puck for controlling the depth of cut is described. In the Moritz system a platen member which is hinged to the recording lathe at one end supports the cutting stylus and air puck. In operation, the pressure of the air to the air puck is adjusted to support the platen assembly (i.e., platen member, air puck and stylus) at a height sufficient to cut grooves to a predetermined length. Since the platen assembly is hinged at one end in the Moritz apparatus the cutting stylus swings in an arc such that the angle which the cutting face of the stylus makes with the disc substrate may vary in accordance with surface variations of the substrate thus detrimentally affecting the signal cut on the substrate. The hinged arrangement also affects the parallelism between the bottom surface of the air puck and the disc surface. When the air puck bottom surface is not parallel to the disc, the supporting air column may escape at different rates from one side of the air puck compared to the other side, thus affecting the depth of cut.

In U.S. patent application Ser. No. 106,524, filed on Dec. 26, 1979, for Gunter, entitled "Dual Parallelogram Cutterhead Suspension Apparatus" now U.S. Pat. No. 4,310,915 another electromechanical video disc cutting apparatus having an air puck for controlling the depth of cut is described. In the John system, the cutting stylus and air puck are suspended by a pair of parallel spring steel leafsprings from the main frame of the recording lathe. The parallel suspension provides a noticeable improvement in the ability of the stylus to follow the surface contour of the substrate surface. In general, the active surface of the stylus support mechanism (i.e., the air puck) and the surface of the substrate are maintained in a parallel relationship such that stylus cuts a groove parallel to the substrate surface.

In the John system, however, the air puck is rigidly fixed to the suspension frame such that the active surface thereof is not able to follow the surface contour when the surface undulates at too high of a rate (e.g., 10 Hz).

In accordance with the principles of the present invention, an electromechanical video disc cutting apparatus is provided. In this apparatus, a gimballed air puck is provided for controlling the depth of cut of the recording stylus. The gimballed air puck permits the cutting stylus to more closely follow the surface of the substrate during the cutting operation.

This arrangement has several advantages over prior art schemes. In the prior art, the stylus is not able to faithfully negotiate the "ups" and "downs" of the substrate surface, thus it is subjected to a cyclical pounding. The gimballed air puck arrangement of the present invention should reduce this pounding since the stylus more nearly follows the contour of the substrate surface. Thus, the gimballed arrangement should extend the life of a cutting stylus. Another advantage of the gimballed air puck is that metal substrates having relatively large vertical run-out may be used. Normally, substrates of vertical run-out of greater than 2 micrometers are rejected causing a loss of time and money.

The gimballed air puck arrangement may simplify and reduce the processing steps necessary to prepare a substrate for recording. Presently, the substrate working surface is leveled by a lathe facing operation prior to the recording operation. With an air puck arrangement which can more nearly follow the substrate surface, this facing operation may be eliminated. A fourth advantage of the gimballed puck arrangement involves the depth of cut. Since the stylus will be able to follow the surface contour more closely, a shallower depth of cut may be used. Since cutting force and temperature are a function of cutting depth, a shallower cut may reduce the load on the piezoelectric element and stylus, thus increasing the cutterhead life.

In accordance with one aspect of the present invention, an apparatus for recording information signals in a substrate is provided. The apparatus includes means for recording variations representative of the information signals on a surface of the substrate. Means are provided for establishing relative motion between the substrate and the recording means. Further, the apparatus includes means for providing a column of gas for supporting the apparatus at a given dimension above the surface of the substrate when the substrate is in a working position. The gas providing means includes a gas delivery puck arranged in a swivel fashion such that a flat lower surface of the gas delivery puck follows the surface contour of the substrate as the substrate surface undulates during the occurrence of the relative motion.

In accordance with another aspect of the present invention, the gas providing means includes a gas delivery tube having a ball-shaped tip. The ball-shaped tip is arranged to engage the gas delivery puck thus providing a pivot point for the swivelling action of the gas delivery puck. Further, a retained plate for coupling the gas delivery tube to the gas delivery puck is provided.

In accordance with one embodiment of the present invention, the air delivery puck is formed of brass. The brass air delivery puck has an aperture for directing the column of gas onto the substrate surface and a conical-shaped opening concentric with the aperture for receiving the ball-shaped tip of the gas delivery tube.

Other features and advantages of the invention will be more fully understood from the following detailed description of the preferred embodiment, the appended claims and the accompanying drawing in which:

FIG. 1 shows, partly via a block diagram representation, a system for electromechanically cutting a groove and signal information in a metal substrate pursuant to the principles of the present invention;

FIG. 3 shows an exploded view of the gimballed air puck pursuant to the principles of the present invention; and FIGS. 4 and 5 show cross-sectional views of other embodiments of the gimballed air puck of the present invention.

Figure 2:
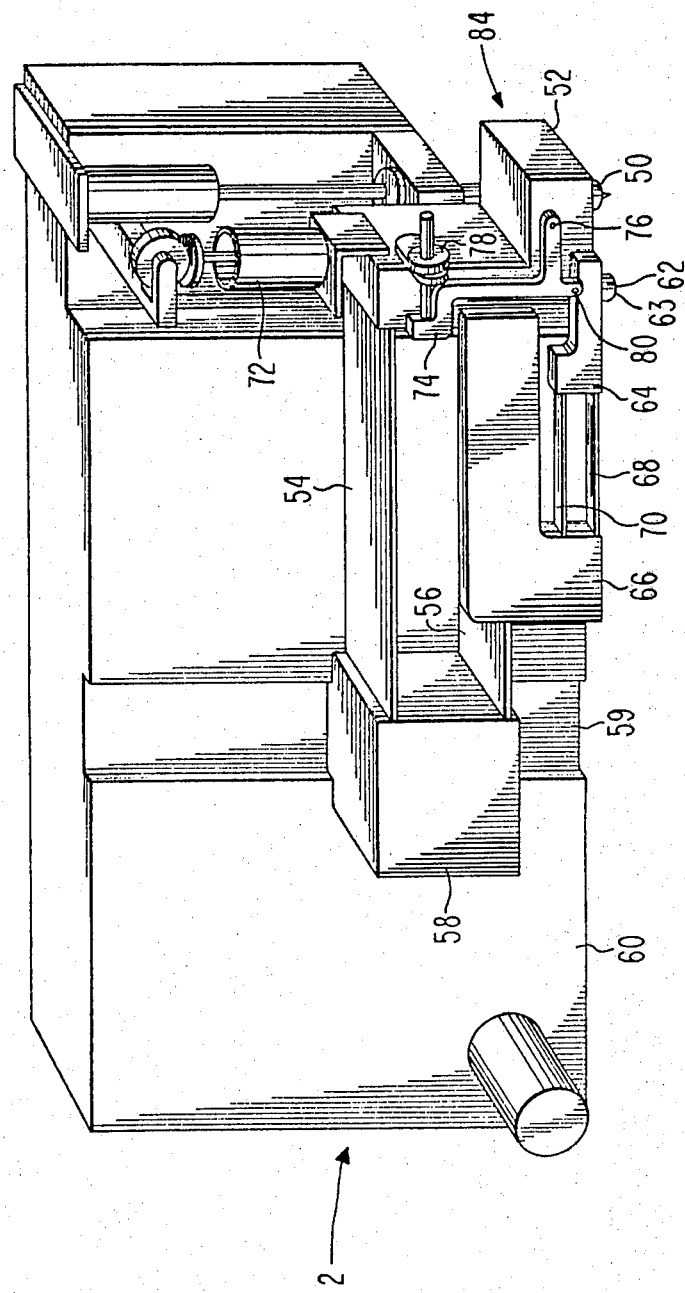
FIG. 2 shows a perspective view of the suspension apparatus for use with the system of FIG. 1 pursuant to the principles of the present invention.

FIG. 1 illustrates a system for electromechanically cutting a groove and short wavelength modulation in a metal substrate 10. The metal substrate 10 is placed on a turntable 11 in operating relationship with suspension head 12 including a diamond stylus 13. The cutting stylus 13 is positioned with respect to the metal substrate 10 such that a groove 14 having a quiescent groove depth less than 1 micrometer is cut while relative motion is established between stylus 13 and metal substrate 10. In one preferred arrangement, head suspension 12 is moved linearly on slide 25 while turntable 11 is rotated such that stylus 13 cuts a spiral groove in a disc-shaped metal substrate. The cutting stylus 13 is vibrated in response to a relatively high frequency signal (e.g., approximately 5 MHz) while cutting the groove in order to effect short wavelength modulation having a peak-to-peak dimension which is typically less than the groove depth. The electromechanical recording of short wavelength modulation in a metal substrate provides replica discs having a high signal-to-noise ratio.

The formation of the relatively high frequency signal (the time variation of which is represented by the spatial variation in the groove bottom) will now be described with reference to FIG. 1 by way of example only. Illustratively, a video camera 15 scans an image 16 for developing a video signal at the output thereof. The video signal may include components representative of the luminance and chrominance of the scanned image 16. The output signal of the video camera 15 is slowed-down (e.g., by a factor of two) by a video slow-down processor 39 in order to accommodate the bandwidth of the cutterhead. A video modulator 17, coupled to the video slow-down processor 39, frequency modulates a slowed-down high frequency carrier over a high frequency deviation range (e.g., of the order of 4.8/2–6.8/2 MHz) in accordance with the slowed-down video signal.

Simultaneously, microphone 18 picks up the audio signal accompaniment of the video signal from a speaker 19. The output signal of the microphone 18 is likewise slowed-down (e.g., also by a factor of two) by an audio slow-down processor 40 in order to synchronize the audio signal with the slowed-down video signal. An audio modulator 20, coupled to the audio slow-down processor 40, frequency modulates a slowed-down low frequency carrier over a low frequency deviation range (e.g., of the order $716/2 \pm 50/2$ KHz) in accordance with the slowed-down audio signal developed at the output of the microphone 18. An audio/video modulator 21 modulates the once-modulated, slowed-down, low frequency carrier with the once-modulated, slowed-down, high frequency carrier as described, illustratively, in the aforementioned U.S. Pat. No. 4,044,379 Halter patent. A relatively high frequency signal at the output of the audio/video modulator 21 energizes cutting stylus 13 during the recording operation in order to effect short wavelength modulation (e.g., 0.6–1.6 micrometers) while cutting groove 14 in metal substrate 10 at a slowed-down recording speed (e.g., 450/2 rpm).

The suspension head 12 described with reference to FIG. 1 is shown in more detail in the perspective view of FIG. 2. It should be noted that a suspension head apparatus is described in the aforementioned John application. Cutting stylus assembly 50, which may be of a type described in U.S. Pat. No. RE 29,113, issued on Jan. 11, 1977 to J. B. Halter, entitled "Triangular Piezoelectric Transducer For Recording Video Information," incorporated herein by reference, is mounted to mounting block 52 which, in turn, is mounted via spring steel leafspring members 54, 56 to mounting block 58. Base 60 provides a structure suitable for mounting to slide 25 of FIG. 1 and for suspending mounting block 52 via spring members 54,56 and mounting block 58. Resiliently suspended from mounting block 52 is air puck 62 (the air supply is not shown). The air puck 62 which is mounted to mounting block 64 is attached to arm 66 via spring steel leafspring members 68, 70. Air puck 62 will be described in greater detail with reference to FIGS. 3, 4, and 5. Additionally, mounting block 52 is attached to base 60 through an oil damper mechanism 72. The vertical position of base 63 of air puck 62 relative to the tip of cutting stylus assembly 50 may be adjusted by lever 74 which is pivoted on pin 76. When screw 78 is turned such that lever 74 rotates in a counterclockwise direction about pin 76, pin 80 urges mounting block 64, and thereby air puck 62, down. On the other hand, when screw 78 is turned in the opposite direction; air puck 62 is urged up by the biasing force of spring members 68, 70.

In operation the suspension head 12 controls the depth of cut made by the diamond stylus. Mounting block 52 is lowered slowly until the base 63 of air puck 62 is a few micrometers from the disc surface (not shown in FIG. 2) i.e., until the air pressure between base 63 of air puck 62 and the recording master surface equalizes the gravitational force of suspension assembly 84. It should be noted that before suspension assembly 84 is lowered, lever 74 is adjusted such that stylus assembly 50 will not engage the metal substrate when the air puck is in its lowered position. With air puck 62 riding a few micrometers above the metal substrate surface, screw 78 is adjusted so that the tip of cutting stylus assembly 50 is nearly touching the surface of the metal substrate, thus placing cutting stylus assembly 50 in a ready position. To start a cut, the air pressure to air puck 62 is decreased causing the tip of stylus assembly 50 to enter the metal substrate surface to a quiescent depth (illustratively, the nominal depth of cut is approximately 0.5 $\mu$m).

Stray mechanical resonances may be deleterious to the recording process. In order to reduce such undesired resonances, spring steel members 54, 56, 68, 70 may be coated with a vibration damping compound such as SOUND-OFF, a product of Quaker State Refining Corp. Additionally, oil dash pot 72 aids in reducing any unwanted resonances. In one preferred, but non-limiting, embodiment suspension 84 is provided having a natural resonant frequency of approximately 45 hertz.

The parallel beam arrangement, as illustrated in FIG. 2, is designed to maintain parallelism between the active surface, i.e., base 63, of air puck 62 and the surface of the metal substrate, and simultaneously to maintain the angle between the stylus and the metal substrate surface substantially constant. Thus, the variations cut into the bottom of the information track (groove) will be a substantially faithful representation of the information signals. In this parallel beam arrangement, the relative position of base 63 with respect to the tip of the stylus may be adjusted using screw 78 without affecting the parallelism of base 63 or the angle of the stylus with respect to the metal substrate surface.

FIG. 3 shows an exploded view of gimballed air puck 62. Air puck 62 includes an air delivery puck 100 which is free to swivel on the tip of air delivery tube 106. A column of air 102 supports suspension 84 of FIG. 2 above the surface of disc 10. The air delivery puck 100 may be formed of a soft bearing type material such as brass. Resting in a conical-shaped opening 104 of air delivery puck 100 is air delivery tube 106. Tube 106 may be formed of two parts, supply tube and support member 108 and ball 110. Retainer 112 which illustratively may be formed of a plastic material is used to secure air delivery tube 106 to air delivery puck 100.

In operation a gas (for example, filtered air) is pumped into air delivery tube 106, thus forming a column of gas 102 which provides support for suspension 84 above the surface of the substrate. An aperture 114 which directs the air column is formed in air delivery puck 100 concentric with conical-shaped opening 104. The air delivery puck 100 is free to swivel or gimbal around ball 110 of air delivery tube 106. In this manner, air delivery puck 100 of air puck 62 is free to rotate on ball 110 so that the lower surface 63 of air delivery puck 100 remains parallel to the surface of the metal substrate as the surface undulates during the occurrence of relative motion between the substrate and the stylus. The inside diameter of tube 106 is larger than aperture 114 of puck 100 so that the gas supply is not reduced as the puck swivels.

Puck 100 is shown with recess 116 cut in the bottom thereof. Recess 116 provides an air chamber which effectively assists in damping the suspension assembly. The size of recess 116 may be critical to the electromechanical cutting operation. If the recess is too large the air trapped therein will cause the puck to chatter like a pneumatic hammer. On the other hand, if the air chamber is too small the load carrying capability will be reduced. Illustratively, recess 116 may be 2 to 4 mm in diameter and 0.1 mm deep in an air delivery puck having dimensions of 8.0 mm in diameter and 3.0 mm high.

FIGS. 4 and 5 show other arrangements for the gimballed puck of the present invention. Referring to FIG. 4, an air puck 200 which is very similar to air puck 62 of FIG. 3 is shown. Air puck 200 comprises air delivery puck 202, air delivery tube 204 and retainer 206. In the arrangement of FIG. 4, the air delivery puck 202 is provided with a spherical-shaped opening 207 rather than the conical opening of the air delivery puck of FIG. 3. In accordance with this embodiment, ball 208 of air delivery tube 204 engages the spherical-shaped opening 207 of air delivery puck 202.

Air delivery puck 202 is also provided with a flexible, non-metallic (e.g., polytetrafluoroethylene) ring 210 on the periphery thereof. Ring 210 is provided to reduce the chance of damaging the substrate when the suspension is lowered to the substrate surface. If the initial setting of the puck working surface is not parallel to the substrate surface, then ring 210 will prevent damage to the substrate surface when suspension 84 of FIG. 2 is lowered and the edge of air delivery puck 202 contacts the substrate surface.

Referring to FIG. 5, an air puck assembly 250 is shown. In this arrangement, the air delivery puck 252 is provided with a multiplicity of air chambers 254. In one embodiment, four separate air chambers 254 may be disposed at 90° angles around the periphery of the air delivery puck 252.

While the principles of the present invention have been demonstrated with particular regard to the illustrated structure of the FIGURES, it will be recognized that various departures of such illustrated structure may be undertaken in practice of the invention. For example, the plastic retainer plate described with reference to FIGS. 3, 4, and 5 may be formed of a material (e.g., rubber) which provides some restorative force to maintain the lower surface of the puck in a substantially horizontal position as the puck rolls and pitches about the pivot.

What is claimed is:
1. Apparatus for recording information signals in a substrate comprising:
  means for recording variations representative of said information signals on a surface of said substrate;
  means for establishing relative motion between said recording means and said substrate;
  means for providing a column of gas for supporting said apparatus at a given dimension above said surface of said substrate when said substrate is in a working position, said gas providing means including a gas delivery puck; and
  gimbal means for supporting said gas delivery puck such that said gas delivery puck swivels to allow a flat lower surface of said gas delivery puck to follow the surface contour of said substrate as said substrate surface undulates during the occurrence of said relative motion.

2. The apparatus according to claim 1 wherein said means for recording includes:
- a piezoelectric element electrically coupled to a source of video and accompanying audio signals; and
- a cutting stylus, rigidly mounted to said piezoelectric element, for cutting said variations along a spiral track on said surface of said substrate.

3. The apparatus according to claim 2 wherein said gimbal means comprises:
- a gas delivery tube having a ball-shaped tip, said tip of said tube engaging said gas delivery puck and providing a pivot point for the swivelling action of said gas delivery puck; and
- a retainer plate for coupling said gas delivery tube to said gas delivery puck.

4. The apparatus according to claim 3 wherein said gas delivery puck is formed of brass, said brass gas delivery puck having an aperture for directing said column of gas onto said substrate surface and having a conical-shaped opening concentric with said aperture for receiving said ball-shaped tip of said gas delivery tube.

5. The apparatus according to claim 3 wherein said gas delivery puck is formed of brass, said brass gas delivery puck having an aperture for directing said colun of gas onto said substrate surface and having a spherical-shaped opening concentric with said aperture for receiving said ball-shaped tip of said gas delivery tube.

6. The apparatus according to claim 4 wherein said gas delivery puck includes a non-metallic ring around the periphery thereof.

7. The apparatus according to claim 3 wherein said gas delivery puck is formed of brass, said brass gas delivery puck having a plurality of gas chambers for directing a plurality of gas columns for supporting said apparatus.

8. Apparatus for electromechanically recording information signals in a substrate comprising:
- a stylus for cutting a groove and signal elements along the length of said groove representative of said information signals in a metal surface of said substrate;
- means for establishing relative motion between said stylus and said substrate; and
- means for providing a column of gas for supporting said stylus so that said stylus cuts said groove to a given nominal depth, said gas providing means including a gas delivery puck; and
- gimbal means for supporting said gas delivery puck such that said gas delivery puck swivels to allow a flat lower surface of said gas delivery puck to follow the surface contour of said substrate as said substrate surface undulates during the occurrence of said relative motion.

9. The apparatus according to claim 8 further comprising:
- a source of video and accompanying audio signals; and
- a piezoelectric element, rigidly coupled to said cutting stylus, responsive to said source of signals for driving said cutting stylus to cut said signal elements.

10. The apparatus according to claim 9 wherein said gimbal means comprises:
- a gas delivery tube having a ball-shaped tip, said tip of said tube engaging said gas delivery puck and providing a pivot point for the swivelling action of said gas delivery puck; and
- a retainer plate for coupling said gas delivery tube to said gas delivery puck.

11. The apparatus according to claim 10 wherein said gas delivery puck is formed of brass, said brass gas delivery puck having an aperture for directing said column of gas onto said substrate surface and having a conical-shaped opening concentric with said aperture for receiving said ball-shaped tip of said gas delivery tube.

12. Apparatus for electromechanically recording information signals in a disc-shaped substrate comprising:
- a foundation;
- a first mounting member;
- a first pair of parallel resilient members coupling said first mounting member to said foundation, said first mounting member being mounted to move in a substantially vertical direction;
- a piezoelectric element rigidly mounted to said first mounting member;
- a cutting stylus rigidly mounted to said piezoelectric element, said stylus being positioned to engage a metal surface of said substrate when sad substrate is in a working position to cut a groove for guiding a playback stylus and being driven by said piezoelectric element to cut signal elements along the length of said groove representative of said information signals;
- means for effecting relative motion between said stylus and said substrate such that said groove is cut in said metal surface in a spiral fashion;
- means for providing a column of gas for supporting said stylus so that said stylus cuts said groove to a given nominal depth, said gas providing means including a gas delivery puck; and
- gimbal means for supporting said gas delivery puck such that said gas delivery puck swivels to allow a flat lower surface of said gas delivery puck to follow the surface contour of said substrate as said substrate surface undulates during the occurrence of said relative motion.

13. The apparatus according to claim 12 further comprising:
- a second mounting member for supporting said gas providing means; and
- a second pair of parallel resilient members coupling said first mounting member to said second mounting member, said second mounting member being mounted by said second pair of parallel resilient members such that said gas providing means moves in a substantially vertical direction.

14. The apparatus according to claim 13 wherein said first and said second pair of resilient members comprise a pair of spring steel leafsprings damped such that the natural resonant frequency of said apparatus is approximately 45 hertz.

15. The apparatus according to claim 14 wherein said gimbal means comprises:
- a gas delivery tube having a ball-shaped tip, said tip of said tube engaging said gas delivery puck and providing a pivot point for the swivelling action of said gas delivery puck; and
- a retainer plate for coupling said gas delivery tube to said gas delivery puck.

16. The apparatus according to claim 15 wherein said gas delivery puck is formed of brass, said brass gas delivery puck having an aperture for directing said column of gas onto said substrate surface and having a conical-shaped opening concentric with said aperture for receiving said ball-shaped tip of said gas delivery tube.

* * * * *

UNITED STATES PATENT AND TRADEMARK OFFICE
CERTIFICATE OF CORRECTION

PATENT NO. : 4,402,072

DATED : August 30, 1983

INVENTOR(S) : Joseph Guarracini et al.

It is certified that error appears in the above-identified patent and that said Letters Patent is hereby corrected as shown below:

| | |
|---|---|
| Col. 2, line 1 | "length" should be -- depth --. |
| Col. 2, line 15 | "Gunter" should be -- John --. |
| Col. 6, line 9 | "threin" should be -- therein --. |
| Col. 7, line 29 | "colun" should be -- column --. |
| Col. 8, line 27 | "sad" should be -- said --. |

Signed and Sealed this

Twenty-ninth Day of November 1983

[SEAL]

Attest:

GERALD J. MOSSINGHOFF

*Attesting Officer*     *Commissioner of Patents and Trademarks*